United States Patent
Guo et al.

(10) Patent No.: US 11,836,726 B2
(45) Date of Patent: Dec. 5, 2023

(54) GAME IMAGE PROCESSING METHOD, ELECTRONIC DEVICE, AND COMPUTER STORAGE MEDIUM

(71) Applicant: SENSETIME INTERNATIONAL PTE. LTD., Singapore (SG)

(72) Inventors: Zhiyang Guo, Singapore (SG); Xinxin Wang, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 239 days.

(21) Appl. No.: 17/363,094

(22) Filed: Jun. 30, 2021

(65) Prior Publication Data

US 2022/0414673 A1 Dec. 29, 2022

Related U.S. Application Data

(63) Continuation of application No. PCT/IB2021/055675, filed on Jun. 25, 2021.

(30) Foreign Application Priority Data

Jun. 23, 2021 (SG) .......................... 10202106863Q (51) Int. Cl.
*G06Q 20/40* (2012.01)
*G06T 7/70* (2017.01)
(Continued)

(52) U.S. Cl.
CPC ....... *G06Q 20/40145* (2013.01); *G06F 16/53* (2019.01); *G06T 7/70* (2017.01);
(Continued)

(58) Field of Classification Search
None
See application file for complete search history.

(56) References Cited

U.S. PATENT DOCUMENTS

2005/0039053 A1 2/2005 Walia
2008/0076529 A1 3/2008 Richards
(Continued)

FOREIGN PATENT DOCUMENTS

AU 2020203247 A1 12/2020
JP 2005287521 A 10/2005
(Continued)

OTHER PUBLICATIONS

International Search Report in the international application No. PCT/IB2021/055675, dated Oct. 20, 2021, 3 pgs.
Written Opinion of the International Search Authority in the international application No. PCT/IB2021/055675, dated Oct. 20, 2021, 5 pgs.
(Continued)

*Primary Examiner* — Delomia L Gilliard
(74) *Attorney, Agent, or Firm* — Cooper Legal Group, LLC (57) ABSTRACT

Game image processing method, an electronic device, and a computer storage medium are provided. The method includes: in a money substitute operating stage, a first game image is acquired, and first money substitute information and human body image that are detected or recognized from the first game image are associated to obtain association information; in a payout stage, a detection and recognition result for a second game image is acquired before payment or collection of money substitute, the detection and recognition result at least including second money substitute information; when the second money substitute information is successfully associated with a target human body image of the human body image according to the association information, personal identity information corresponding to the target human body image is queried; and payout information corresponding to the personal identity information is deter- (Continued)

mined according to the second money substitute information and a game result.

16 Claims, 3 Drawing Sheets

(51) Int. Cl.
*G06F 16/53* (2019.01)
*G06V 20/64* (2022.01)
*G06V 40/10* (2022.01)
*G07F 17/32* (2006.01)

(52) U.S. Cl.
CPC ............ *G06V 20/64* (2022.01); *G06V 40/103* (2022.01); *G07F 17/3206* (2013.01); *G07F 17/3241* (2013.01); *G06T 2207/30196* (2013.01); *G06T 2207/30204* (2013.01); *G06T 2207/30242* (2013.01)

(56) References Cited

U.S. PATENT DOCUMENTS

| | | | |
|---|---|---|---|
| 2016/0350334 | A1 | 12/2016 | Bataller |
| 2017/0039807 | A1* | 2/2017 | Shigeta ............... G07F 17/3248 |
| 2017/0300744 | A1 | 10/2017 | Ju |
| 2019/0259238 | A1* | 8/2019 | Shigeta ............... G07F 17/3248 |
| 2020/0175805 | A1 | 6/2020 | Nagata |
| 2020/0402344 | A1 | 12/2020 | Shigeta |
| 2020/0402357 | A1* | 12/2020 | Moore ................ G07F 17/3237 |
| 2021/0056804 | A1* | 2/2021 | Eager ................. G07F 17/3239 |
| 2021/0110648 | A1* | 4/2021 | Bucher ............... G07F 17/3209 |

FOREIGN PATENT DOCUMENTS

| | | | |
|---|---|---|---|
| JP | 6080145 | B1 | 2/2017 |
| JP | 2019522507 | A | 8/2019 |
| KR | 20180052767 | A | 5/2018 |
| KR | 20190064629 | A | 6/2019 |
| KR | 20190122559 | A | 10/2019 |
| SG | 10201913763 | A | 4/2021 |
| WO | 2020158039 | A1 | 8/2020 |
| WO | 2021202526 | A1 | 10/2021 |

OTHER PUBLICATIONS

Written Opinion of the Singaporean application No. 10202106863Q, dated Oct. 20, 2021, 9 pgs.
"Commission Baccarat", (RWS) Game Rules Version 4, Sep. 2019, reprinted from the Internet at: https://www.cra.gov.sg/licenses-approvals/approvals/game-rules/games?cat=Baccarat%20Games%20(RWS)#, 17 pgs.
"Commission Baccarat With Insurance", (RWS) Game Rules Version 5, Sep. 2019, reprinted from the Internet at: https://www.cra.gov.sg/licenses-approvals/approvals/game-rules/games?cat=Baccarat%20Games%20(RWS)#, 22 pgs.
"Da Hu Ying Xiong (Non-Commission Baccarat)", (RWS) Game Rules Version 2, Jun. 2020, reprinted from the Internet at: https://www.cra.gov.sg/licenses-approvals/approvals/game-rules/games?cat=Baccarat%20Games%20(RWS)#, 23 pgs.
"Dragon Tiger", (RWS) Game Rules, Nov. 2021, reprinted from the Internet at: https://www.cra.gov.sg/licenses-approvals/approvals/game-rules/games?cat=Baccarat%20Games%20(RWS)#, 29 pgs.
"RWS Baccarat", (RWS) Game Rules Version 3, Jun. 2020, reprinted from the Internet at: https://www.cra.gov.sg/licenses-approvals/approvals/game-rules/games?cat=Baccarat%20Games%20(RWS)#, 26 pgs.
First Office Action of the Japanese application No. 2021-549462, dated Feb. 8, 2023, 8 pgs.
Notification of Material Filed by a Third Party of the Australian application No. 2021204616, dated Jul. 28, 2022, 6 pgs.
Third Office Action of the Australian application No. 2021204616, dated Jun. 20, 2023. 6 pages.
Notice of Allowance of the Korean application No. 10-2021-7026667, dated Jun. 29, 2023. 5 pages with English translation.
Second Office Action of the Australian application No. 2021204616, dated Apr. 21, 2023, 5 pages.

\* cited by examiner

GAME IMAGE PROCESSING METHOD, ELECTRONIC DEVICE, AND COMPUTER STORAGE MEDIUM

CROSS-REFERENCE TO RELATED APPLICATIONS

The present application is a continuation of International Patent Application No. PCT/IB2021/055675, filed on Jun. 25, 2021, which claims priority to Singapore Patent Application No. 10202106863Q, filed on Jun. 23, 2021. The contents of International Patent Application No. PCT/IB2021/055675 and Singapore Patent Application No. 10202106863Q are incorporated by reference in their entireties.

TECHNICAL FIELD

The disclosure relates to a computer vision processing technology, and relates, but not limited to, a game image processing method and apparatus, an electronic device, a computer storage medium and a computer program.

BACKGROUND

At present, a game platform image may be acquired through a monitoring system, so that money substitute and players in the game platform image are detected. However, there are some uncontrollable factors in a game process, for example, the condition that the player lowers his or her head in the game process, the condition that the player occludes the money substitute, and the light on the game site. These factors may affect the accuracy of a detection result for detecting the money substitute and the players, namely the accuracy of recognizing the money substitute associated with each player is reduced to a certain extent. As a result, the accuracy of determining payout information corresponding to the player is reduced.

SUMMARY

The disclosure relates to a computer vision processing technology. Embodiments of the disclosure are intended to provide a game image processing method and apparatus, an electronic device, a computer storage medium and a computer program, which may recognize a money substitute corresponding to each player accurately and improve the accuracy of determining payout information corresponding to the player.

The embodiments of the disclosure provide a game image processing method, which includes the following operations.

In a money substitute operating stage of a game, a first game image of the game is acquired, and first money substitute information and human body image that are detected or recognized from the first game image are associated to obtain association information.

In a payout stage of the game, a detection and recognition result for a second game image of the game is acquired before payment or collection of money substitute, the detection and recognition result at least including second money substitute information.

In a case of determining that the second money substitute information is successfully associated with a target human body image of the human body image according to the association information, personal identity information corresponding to the target human body image is queried.

Payout information corresponding to the personal identity information is determined according to the second money substitute information and a game result of the game.

The embodiments of the disclosure also provide a game image processing apparatus, which includes an association module, an acquisition module, a query module, and a determination module.

The association module is configured to, in a money substitute operating stage of a game, acquire a first game image of the game, and associate first money substitute information and human body image that are detected or recognized from the first game image, to obtain association information.

The acquisition module is configured to, in a payout stage of the game, acquire a detection and recognition result for a second game image of the game before payment or collection of money substitute, the detection and recognition result at least including second money substitute information.

The query module is configured to, in a case of determining that the second money substitute information is successfully associated with a target human body image of the human body image, query personal identity information corresponding to the target human body image.

The determination module is configured to determine payout information corresponding to the personal identity information according to the second money substitute information and a game result of the game.

The embodiments of the disclosure also provide an electronic device, which includes a processor and a memory configured to store a computer program capable of running in the processor. The processor is configured to run the computer program to perform any of the operations in the game image processing method as described above.

The embodiments of the disclosure also provide a computer storage medium having stored therein a computer program which is executed by a processor to implement any of the operations in the game image processing method as described above.

The embodiments of the disclosure also provide a computer program, comprising computer-readable codes, where execution of the computer-readable codes by a computer causes the computer to execute the game image processing method as described above.

It is to be understood that the above general description and the following detailed description are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the specification, serve to describe the technical solutions of the disclosure.

DETAILED DESCRIPTION

The disclosure will further be described below in combination with the drawings and the embodiments in detail. It is to be understood that the embodiments provided herein are only adopted to explain the disclosure and not intended to limit the disclosure. In addition, the embodiments provided below are not all embodiments implementing the disclosure but part of embodiments implementing the disclosure, and the technical solutions recorded in the embodiments of the disclosure may be freely combined for implementation without conflicts.

It is to be noted that, in the embodiments of the disclosure, terms "include" and "comprise" or any other variant thereof is intended to cover nonexclusive inclusions herein, so that method or device including a series of elements not only includes those clearly recorded elements but also includes other elements which are not clearly listed or further includes intrinsic elements for implementing the method or the device. Under the condition of no more limitations, an element defined by a statement "including a/an" does not exclude existence of another related element in a method or device including the element (for example, steps in the method or units in the device, the units may be, for example, part of a circuit, part of a processor and part of a program or software).

For example, a game image processing method provided in the embodiments of the disclosure includes a series of steps, but the game image processing method provided in the embodiments of the disclosure is not limited to the disclosed steps. Similarly, a game image processing apparatus provided in the embodiments of the disclosure includes a series of modules, but the apparatus provided in the embodiments of the disclosure is not limited to include the clearly disclosed modules, and may further include a module to be arranged when related information is acquired or processing is performed based on information.

In the disclosure, term "and/or" is only an association relationship describing associated objects and represents that three relationships may exist. For example, A and/or B may represent three conditions: i.e., independent existence of A, existence of both A and B and independent existence of B. In addition, term "at least one" in the disclosure represents any one of multiple or any combination of at least two of multiple. For example, including at least one of A, B and C may represent including any one or more elements selected from a set formed by A, B and C.

The embodiments of the disclosure may be applied to an edge computing device in a game scene, and may be operated together with numerous other universal or dedicated computing system environments or configurations. Here, the edge computing device may be a thin client, a thick client, a handheld or laptop device, a microprocessor-based system, a set-top box, a programmable consumer electronic product, a network personal computer, a minicomputer system, etc.

The edge computing device may be described in a general context of computer system-executable instructions, such as program modules being executed by a computer system. Generally, the program module may include routines, programs, target programs, components, logics, data structures and the like, which perform specific tasks or implement specific abstract data types. The computer system/server may be practiced in distributed cloud computing environments where tasks are performed by remote processing devices that are connected through a communication network. In the distributed cloud computing environments, the program modules may be located in a storage medium of a local or remote computer system including a storage device.

In the related art, in a game scene, money substitute information is required to be used for calculation of payout information corresponding to a game result, alerting detection of a money substitute (for example, a minimum denomination of the money substitute, and a maximum denomination of the money substitute), etc. A service logic related to calculation of the payout information may be executed accurately to meet a requirement of the game scene only when accurate money substitute information is obtained and corresponding player identity information is found. Therefore, how to improve the recognition accuracy of the money substitute and the player identity information and the accuracy of determining the payout information corresponding to a player is a technical problem urgent to be solved.

For the foregoing technical problem, in some embodiments of the disclosure it is proposed a technical solution for game image processing, which may be applied to a game scene.

An application scene of the embodiments of the disclosure will be exemplarily described below.

In the game scene, running states of various games may be monitored through a computer vision processing technology. Here, running of each game is related to a money substitute.

In some embodiments, a game in the game scene may be poker or other games on a game platform. No limits are made thereto in the embodiments of the disclosure.

In the embodiments of the disclosure, computer vision, as a science that studies how to make machines "see", refers to recognizing, tracking, and measuring a target using video cameras and computers instead of human eyes, and performing further image processing. In a game process, three cameras may be used to detect what happens on the game platform for further analysis. The game platform may be a physical tabletop platform or another physical platform.

Figure 1A:
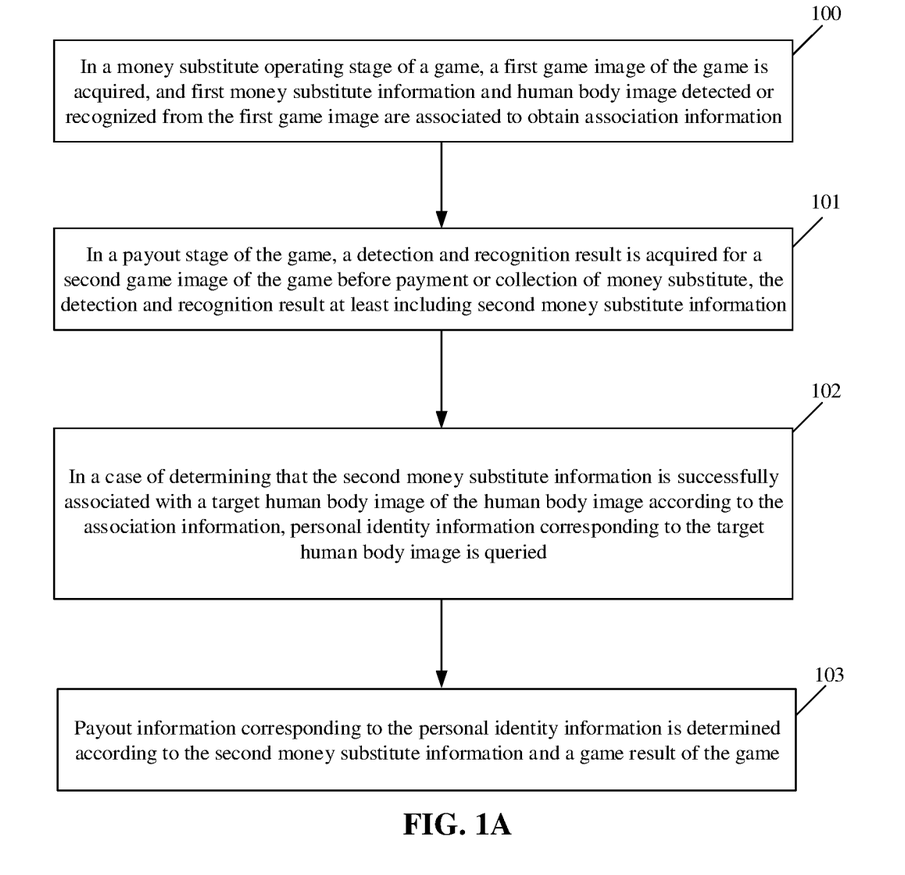
FIG. 1A is a flowchart of a game image processing method according to an embodiment of the disclosure.

FIG. 1A is a flowchart of a game image processing method according to an embodiment of the disclosure. As shown in FIG. 1A, the method may include the following operations.

In operation 100, in a money substitute operating stage of a game, a first game image of the game is acquired, and first money substitute information and human body image that are detected or recognized from the first game image are associated to obtain association information.

In some embodiments, any type of game in a game scene may include multiple game stages from the start of the game to the end of the game, for example, a money substitute operating stage, game props issuing stage, payout stage, etc. The money substitute operating stage represents a game stage that a moving operation is performed on a money substitute in a set region. Exemplarily, the money substitute operating stage may include a first operating stage and a second operating stage. The first operation stage includes a stage of operating a money substitute before game props are issued, and the second operation stage includes a stage of operating a money substitute according to a predetermined marker after the game props are issued, where the predetermined marker is configured to identify a payout ratio. Here, the number of the game stages is related to the type of the game. For example, game stages of a poker game may include a shuffling stage, a gaming stage, a card face showing stage, etc.

In the embodiments of the disclosure, in the money substitute operating stage of the game, a game platform may be shot by using at least one camera to obtain video data or image data for the money substitute operating stage, and then the first game image of the game is acquired from the video data or the image data. Here, the first game image may be an image of the game platform in the money substitute operating stage. Here, the first game image represents one or more frames of image(s).

In some embodiments, the camera for shooting the game platform may be a camera that is located over the game platform and configured to shoot the game platform from the vertical view, or may be a camera for shooting the game platform from another view. Correspondingly, the first game image may be a first game image of the vertical view or the other view. In some other embodiments, the first game image may also be an image obtained by performing fusion processing on the vertical view image and the first game image of the other view.

Exemplarily, after the first game image is obtained in the money substitute operating stage, the first game image may be processed through a computer vision processing technology to obtain a detection and recognition result of the first game image. In some embodiments, the first game image may be detected or recognized to obtain information of a target object in the first game image. The target object at least includes a money substitute. Exemplarily, the target object may further include a human body and playing cards. The human body in the target object may include the whole human body, or may include part of the human body such as a hand and the face. The playing cards in the target object may be playing cards of a type such as spade, heart, diamond, and club. After the target object in the first game image is obtained, a corresponding detection and recognition result may be determined based on the target object in the first game image.

Here, under the condition that the target object in the first game image includes the money substitute, the detection and recognition result may include the first money substitute information. Under the condition that the target object includes the human body, the detection and recognition result includes the human body image. Under the condition that the target object includes the money substitute and the human body, the first money substitute information and human body image in the detection and recognition result are associated.

In some embodiments, the money substitute information includes at least one of the following: personal identity information corresponding to the money substitute, a position of the money substitute, a type of the money substitute, a denomination of the money substitute, or the number of the money substitute.

Here, the position of the money substitute represents position information of the money substitute on the game platform. The type of the money substitute is related to the importance of a personal identity. For example, the importance of a personal identity corresponding to a money substitute of type D is higher than that of a personal identity corresponding to a money substitute of type E. The number of the money substitutes is the number of money substitutes in a money substitute, which may be one money substitute, or may include multiple money substitutes. Here, the multiple money substitutes may form a pile of money substitutes.

In some embodiments, the first game image including the money substitute may be analyzed to determine the information such as the position of the money substitute, the denomination of the money substitute, the type of the money substitute, and the number of the money substitute. The personal identity information corresponding to the money substitute may be determined according to the human body image in contact with the money substitute.

In some embodiments, the operation that the first money substitute information and human body image detected or recognized from the first game image are associated may include the following operations. Money substitute information, that is first detected recognized based on multiple frames of first game images in the money substitute operating stage, is determined as the first money substitute information, or, money substitute information having changed, that is detected or recognized based on multiple frames of first game images acquired in the money substitute operating stage, is determined as the first money substitute information. The first money substitute information is associated with the human body image.

In the embodiments of the disclosure, under the condition that the money substitute first appears at a set position of the game platform, target recognition may be performed on the acquired multiple frames of first game images to obtain the first money substitute information that is detected or recognized for the first time. Under the condition that the money substitute changes, i.e., increases or decreases at the set position of the game platform, target detection or recognition may be performed on the acquired multiple frames of first game images to obtain the changed first money substitute information.

Here, the set position represents a position for placing the money substitute in the game process. Exemplarily, the position, size, and number of the set position on the game platform are determined according to a game rule, and will not be limited in the embodiments of the disclosure.

In an implementation mode, each person may place his or her money substitute at the same set position, or may stagger the money substitute at different set positions. The money substitute at the same set position may be placed by the person at one time, or may be placed by the person at many times.

Here, the condition that the money substitute information is recognized for the first time or the money substitute information is recognized to have changed is very likely to occur due to contact with a human body. Therefore, the money substitute information is associated with the human body image under this condition, which may improve the association accuracy therebetween.

In operation 101, in a payout stage of the game, a detection and recognition result for a second game image of the game is acquired before payment or collection of money substitute, the detection and recognition result at least including second money substitute information.

In the embodiments of the disclosure, in the payout stage of the game, the game platform may be shot by using at least one camera to obtain video data or image data for the payout stage, and then the second game image of the game is acquired from the video data or the image data before payment or collection of money substitute. Here, the second game image may be an image of the game platform in the payout stage. Here, the second game image represents one or more frames of image(s).

Then, the acquired second game image is detected or recognized to obtain the detection and recognition result of the second game image. The detection or recognition at least includes detection or recognition on the money substitute, and the detection or recognition result includes the second money substitute information. Here, a process of acquiring the detection and recognition result of the second game image has been described in the operation 100, and will not be elaborated herein.

In the embodiments of the disclosure, since players usually do not continue operating the money substitute after the game enters the payout stage, before payment or collection of the money substitute, the stability of the money substitute information is relatively high, and the detection and recognition result of the second game image at this time, which may improve the recognition accuracy of the money substitute effectively.

In operation 102, in a case of determining that the second money substitute information is successfully associated with a target human body image of the human body image according to the association information, personal identity information corresponding to the target human body image is queried.

In an implementation mode, the association information obtained by associating the first money substitute information and human body image acquired in the money substitute operating stage includes a corresponding association result. Exemplarily, the association result may include any one of: association uncertainty, association error, association failure, and association success. Here, the association uncertainty represents that it is uncertain whether the money substitute information is successfully associated with the human body image. Association error represents that the money substitute information is associated with a human body image of an unrelated person. Association failure represents that the money substitute information is not associated with a human body image of a related person. Association success represents that the money substitute information is successfully associated with the human body image of the related person. It can be seen that an association condition of the money substitute information and the human body image in the first money substitute operating stage may be obtained according to the operation 100.

In the embodiments of the disclosure, the second money substitute information in the detection and recognition result in the payout stage may be acquired according to the operation 101. The second money substitute information is matched with the first money substitute information, and it may be determined whether the second money substitute information is successfully associated with the human body image according to the association information in combination with operations 100 and 101.

Exemplarily, responsive to determining that the second money substitute information is successfully associated with the human body image, a correspondence between the second money substitute information and the target human body image may be obtained. Furthermore, the personal identity information corresponding to the second money substitute, i.e., identity information of an owner corresponding to the money substitute, may be queried according to the target human body image.

In some embodiments, the operation that the personal identity information corresponding to the target human body image is queried may include the following operations. Identification information for the second money substitute information is acquired. The personal identity information corresponding to the target human body image is queried from a pre-stored personal information table according to the identification information.

Exemplarily, when the first money substitute information and human body image in the money substitute operating stage are associated, the first money substitute information may be identified using the identification information according to their association result. For example, it is predetermined with an algorithm layer that −1, −2, −3, and a character string beginning with as may be used to identify the money substitute information. −1 represents association uncertainty, and re-identification may subsequently be performed according to an acquired human body image. −2 represents association error. −3 represents association failure. The character string beginning with ass represents association success. Here, a value of the identification information may be set according to the game scene, and will not be limited in the embodiments of the disclosure.

In the embodiments of the disclosure, whether the second money substitute information is successfully associated with the human body image may be determined according to the matching of the identification information corresponding to the second money substitute information with the first money substitute information and further according to the association information. Exemplarily, responsive to determining that the second money substitute information is successfully associated with the human body image, the identification information of the second money substitute information is acquired. Then, the target human body image associated with the second money substitute information may be found according to the identification information. Furthermore, the corresponding personal identity information may be queried from the pre-stored personal information table based on the target human body image.

Here, the personal information table pre-stores correspondence between part of human body images and personal identity information. That is, the personal information table may be searched for a human body image matched with the target human body image. Furthermore, the personal identity information corresponding to the target human body image is determined according to the correspondence between the human body images and the personal identity information.

It can be seen that, in the embodiments of the disclosure, the personal identity information corresponding to the target human body image may be queried from the per-stored personal information table. Since the personal information table is pre-stored in a local cache, querying the personal identity information from the personal information table may improve the query efficiency.

In operation 103, payout information corresponding to the personal identity information is determined according to the second money substitute information in the detection and recognition result and a game result of the game.

Here, the game result of the game may include two results, lose or win.

In some embodiments, the operation that the payout information corresponding to the personal identity information is determined may include the following operations. Association results of associating money substitute information and human body images acquired in the first operating stage and second operating stage of the game are determined. The payout information corresponding to the personal identity information is determined according to the association results.

In the embodiments of the disclosure, after the personal identity information corresponding to the target human body image is found in the operation 102, identity information of the owners corresponding to the first money substitute information determined in the payout stage and the association results of associating the second money substitute information and the target human body image acquired in the first operating state and the second operating stage are integrated, to obtain money substitute information respectively associated with the persons participating the game, and payout information corresponding to identity information of each person in the game process may be determined according to win or lose result of the game for each person.

In some embodiments, the operation that the payout information corresponding to the personal identity information is determined according to the association results may include the following operations. A predetermined marker is detected in the second operating stage. The payout information corresponding to the personal identity information is determined according to the association results and a recognition result of the predetermined marker.

Here, a target object in a first game image may be obtained according to a detection and recognition result of the first game image acquired in the second operating stage, the target object at least including the predetermined marker.

Exemplarily, a corresponding predetermined marker may be placed at each position where the money substitute is placed on the game platform in the second operating stage of the game. The predetermined marker is configured to identify a payout ratio. The predetermined markers at different positions may be the same or different, which is specifically determined according to the game scene.

In the embodiments of the disclosure, the payout ratio at a money substitute position may be determined according to the predetermined marker placed at the money substitute position, and the payout information is calculated according to the payout ratio. In a process of integrating the information above, the accuracy of determining the payout information corresponding to the personal identity information may further be improved.

Here, in the process of integrating the information, a classification operation is required to be performed on the money substitute in the payout stage according to the money substitute information. Since multiple persons may be involved in the game, the money substitute may be classified according to personal identity information to obtain money substitute corresponding to each piece of personal identity information. Then, the money substitute corresponding to each piece of personal identity information is classified according to a position of the money substitute, then classified according to a type of the money substitute, and classified according to a denomination of the money substitute. After the above classification operations are completed, money substitute information corresponding to each piece of personal identity information is obtained. Therefore, payout information corresponding to each piece of personal identity information may be determined according to the money substitute information corresponding to each piece of personal identity information.

In some embodiments, a game platform image sent by an image collection device may be received by using an edge computing device. The game platform image includes the first game image and the second game image. The game platform image is an image collected by the image collection device. The image collection device may include at least one camera as mentioned above.

Correspondingly, the edge computing device may be used to acquire the first game image of the game in the money substitute operating stage of the game, and associate the first money substitute information and human body image detected or recognized from the first game image to obtain association information. The second game image is detected and recognized by using the edge computing device to obtain the detection and recognition result of the second game image before payment or collection of money substitute in the payout stage of the game. The payout information corresponding to the personal identity information is determined by using the edge computing device according to the second money substitute information in the detection and recognition result and the game result of the game.

In practical applications, the operations 100 to 103 may be implemented using a processor in an electronic device. The processor may be at least one of an Application Specific Integrated Circuit (ASIC), a Digital Signal Processor (DSP), a Digital Signal Processing Device (DSPD), a Programmable Logic Device (PLD), a Field-Programmable Gate Array (FPGA), a Central Processing unit (CPU), a controller, a microcontroller, or a microprocessor.

In some embodiments, the method may further include the following operation. Under the condition that the personal identity information corresponding to the target human body image is not found from the pre-stored personal information table, personal identity information corresponding to the identification information is queried from an image database according to the identification information.

In the embodiments of the disclosure, if personal identity information corresponding to the target human body image is not found from the pre-stored personal information table, it may be determined that the personal information table does not include the personal identity information. In such case, a query range is extended to an image database in the cloud, and the personal identity information corresponding to the target human body image is queried from the image database in the cloud. Therefore, the accuracy of a query result may be ensured.

Here, a request of querying the personal identity information corresponding to the target human body image may be sent by the edge computing device to the image database in the cloud. The cloud obtains the query result of the image database according to the request, and returns the query result to the edge computing device.

In some embodiments, the method may further include the following operation. The personal identity information found from the image database and the target human body image are stored in the personal information table.

In the embodiments of the disclosure, when the personal identity information corresponding to the target human body image is found through the image database, the found personal identity information and the target human body image are stored in the local personal information table. As such, the personal identity information may be directly found from the personal information table when it is required to be queried next time, and thus the query efficiency is improved.

In some embodiments, the method may further include the following operations. Under the condition that the personal identity information corresponding to the target human body image is not found from the image database, whether the second money substitute information associated with the target human body image meets a set condition is determined. Responsive to determining that the second money substitute information associated with the target human body image meets the set condition, the personal identity information corresponding to the target human body image is acquired according to a manual association instruction.

Here, the set condition may be set according to the game scene. For example, the set condition may be that a total amount of the money substitute in the money substitute information reaches a set amount, or may be that a level of a personal identity corresponding to the money substitute in the money substitute information reaches a set level. For example, the set level is membership level. No limits are made thereto in the embodiments of the disclosure.

In the embodiments of the disclosure, whether the money substitute information associated with the target human body image meets the pre-configured set condition may be determined under the condition that the personal identity information corresponding to the target human body image is not found from the image database. Responsive to determining that the money substitute information associated with the target human body image meets the set condition, the personal identity information corresponding to the money substitute information is continued to be queried according to the manual association instruction, so that the accuracy of the personal identity information is ensured favorably.

In some embodiments, the method may further include the following operation.

The personal identity information corresponding to the target human body image and the target human body image are stored in the personal information table.

Here, the found personal identity information and the target human body image are stored in the local personal information table according to the manual association instruction, so that the query efficiency may be improved when the personal identity information is required to be queried next time.

In some embodiments, the method may further include the following operations. In a case of determining that the second money substitute information fails to be associated with the target human body image according to the association information, whether the second money substitute information meets the set condition is determined according to the association information. Responsive to determining that the second money substitute information meets the set condition, a human body image associated with the second money substitute information and personal identity information corresponding to the human body image are acquired according to the manual association instruction.

In the embodiments of the disclosure, whether the second money substitute information meets the pre-configured set condition may be determined under the condition of determining that the money substitute information fails to be associated with the human body image. The set condition may be any of the abovementioned set conditions. If the second money substitute information meets the set condition, the personal identity information corresponding to the money substitute information is continued to be queried according to the manual association instruction. Therefore, the accuracy of the personal identity information is ensured favorably.

In some embodiments, the method may further include the following operation.

The human body image associated with the second money substitute information and the personal identity information corresponding to the human body image are stored in the personal information table.

Here, the found personal identity information and the human body image associated with the second money substitute information are stored in the local personal information table according to the manual association instruction, so that the query efficiency may be improved when the personal identity information is required to be queried next time.

In the game image processing method and apparatus, electronic device, computer storage medium and a computer program disclosed in the embodiments of the disclosure, in the money substitute operating stage of the game, the first game image of the game is acquired, and the first money substitute information and human body image detected or recognized from the first game image are associated to obtain association information. In the payout stage of the game, the detection and recognition result of the second game image of the game is acquired before payment or collection of money substitute, the detection and recognition result at least including the second money substitute information. In a case of determining that the second money substitute information is successfully associated with a target human body image of the human body image according to the association information, the personal identity information corresponding to the target human body image is queried. The payout information corresponding to the personal identity information is determined according to the second money substitute information and the game result of the game. It can be seen that in the method, the money substitute information and the human body image are associated in the money substitute operating stage of the game, so as to ensure a one-to-one correspondence between money substitute information and human body images. Under the condition that the money substitute information acquired in the payout stage of the game is successfully associated with the human body image, the corresponding personal identity information is queried. The stability of the money substitute information is relatively high after the game enters the payout stage of the game and before payment or collection of the money substitute, and thus the personal identity information corresponding to the human body image that is associated with the money substitute information is queried at this time, which may improve the accuracy of recognizing the money substitute information and the personal identity information, such that the accuracy of determining the payout information corresponding to the personal identity information is improved effectively.

The embodiments of the disclosure will be exemplarily described below in combination with an application scene. In the application scene, the game scene is an intelligent casino scene, where the game platform is a gaming table, the money substitute is chips, the person is players, the unrelated person is a dealer, and the identification information is an association Identity document (ID).

The intelligent casino scene may be poker. Game stages of the poker may include an idle stage, a betting stage, a gaming stage, a payout stage, and a halt stage. The idle stage represents a stage after an edge computing device, etc., are powered on, and in this stage, no service processing result or alert information will be sent to a casino management system. The betting stage represents a stage of betting before the dealer deals cards. The payout stage represents a stage that the dealer performs paying out or collecting money after the game is over. If the dealer does not deal cards according to a game rule or a regulation of the casino, the halt stage is entered. In the halt stage, objects on the gaming table will still be detected and recognized, service processing is performed based on a detection and recognition result, and a service processing result or alert information may be sent to the casino management system.

Payers are not allowed to bet in the idle stage, the payout stage, and the halt stage; the players are allowed to bet in the betting stage, and the dealer deals cards in the gaming stage. In some examples, the players are allowed to bet in the gaming stage. In some other examples, the players are not allowed to bet in the gaming stage.

Exemplarily, the poker may be Baccarat or another type of game. In a Baccarat scene, the dealer draws four to six cards from three to eight decks of shuffled cards, and a win or lose result may be obtained according to a rule. The win or lose result may include: player, bank, TIE, super six, etc. Gained or paid money of the players and the casino is calculated according to the win or lose result per game, payout ratios in different scenes, and whether to take commissions. There are certain rules for card dealing of the dealer and peeking of the player, and if the rules are broken, the monitoring system needs to output warning information.

In the intelligent casino scene, gaming table images in each game stage may be continuously collected by at least one camera, and the collected gaming table images are sent to the edge computing device of the intelligent casino. The gaming table images are detected and recognized in the edge computing device to obtain detection and recognition results of the gaming table images.

The edge computing device may determine the game stages according to the detection and recognition results. The player is allowed to bet only in the betting stage and the gaming stage. The edge computing device acquires information of chips on a tabletop of a present gaming table when the betting stage changes to the gaming stage. According to the Baccarat rule of the casino, the player is not allowed to bet after cards are pulled, and at this time chips may be acquired with minimum interference (which may be considered no interference).

After acquiring chip information when the betting stage changes to the gaming stage, the edge computing device associates chip information of each of chips with a human body image of a player to obtain a corresponding association ID. Here, a value of the association ID is given according to an association result. It is predetermined with an algorithm layer that values of −1, −2, −3, and a character string beginning with as may be given. −1 represents that it is uncertain whether association of the chip is successful, and another value may subsequently be given according to an acquired human body image of the player. −2 represents association with the dealer. −3 represents association failure. The character string beginning with as represents association success. Association success does not represent that corresponding personal identity information may be queried.

Under the condition of determining that association succeeds according to the value of the association ID, the human body image of the player may be queried through the association ID, and then the corresponding personal identity information is queried through search by image. Here, personal identity information is acquired from a locally stored personal information table at first. If not found, the personal identity information is queried from an image database in the cloud. The personal identity information found from the image database and the human body image are stored in the personal information table. Chip information acquired and the personal identity information corresponding to the chip information are synchronized and sent to a payout information calculation module of the edge computing device.

The chip at an insurance position in the gaming stage is monitored by the edge computing device. A payout ratio of the chip at the insurance position is closely related to the card face. Insurance is divided into insurance for the player and bank with four cards, and insurance for the player and bank with five cards. Insurance of different stages and different types correspond to different payout ratios. The edge computing device may determine the payout ratio of the present insurance according to card face information, and when the gaming stage changes to the payout stage, may synchronize and send a present game result and the payout ratio of the insurance to the payout information calculation module of the edge computing device.

Figure 1B:
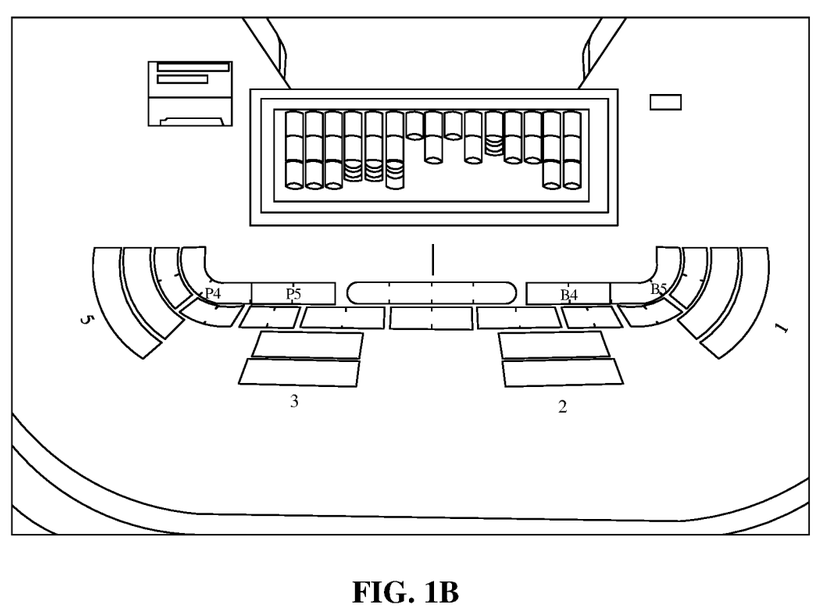
FIG. 1B is a schematic diagram of a scene of playing a game on a game table according to an embodiment of the disclosure.

The insurance position on the tabletop of the game table will be described below through FIG. 1B. FIG. 1B is a schematic diagram of a scene of the game table according to an embodiment of the disclosure. It can be seen that FIG. 1B shows regions where chips are bet on the tabletop of the game table. The regions corresponding to 1, 2, 3, and 5 represent the regions where chips are bet. P4 is an insurance position where the player with four cards may bet. B4 is an insurance position where the bank with four cards may bet. P5 is an insurance position where the player with five cards may bet. B5 is an insurance position where the bank with five cards may bet. In the gaming stage, the player may bet only in P4 and P5, and the bank may bet only in B4 and B5.

When the gaming stage changes to the payout stage, the chip information, acquired when the betting stage changes to the gaming stage, at normal positions (other betting positions except the insurance position) and the chip information, acquired when the gaming stage changes to the payout stage, at the normal positions are aggregated. Personal information query is performed again on chip information which is successfully associated and its corresponding personal identity information is not found, so as to give a value to the personal information.

The information mentioned above may be integrated in the payout information calculation module of the edge computing device to determine payout information corresponding to the chips that each player bets. Here, the chips may be classified according to the personal identity information at first. Then, the chips are classified according to the betting positions of chips, then classified according to the types of chips, and classified according to a denomination of chips. After the above classification operations are completed, the chip information corresponding to each player is obtained. Therefore, the payout information corresponding to each player may be determined according to the chip information corresponding to each player.

In an implementation mode, the edge computing device may further execute chip-related service logic according to the chip information in the gaming table image.

Exemplarily, the chip-related service logic may be: determining whether the game on the present gaming table allows betting with a specific type of chips, determining whether the denomination of the chip is less than a denomination lower limit specified in the game, determining whether the denomination of the chip is greater than a denomination upper limit specified in the game, acquiring the chip information used by the owner of the chip in the game, etc. It is to be noted that the above-mentioned contents are only exemplary descriptions about the chip-related service logic and not intended to limit the embodiments of the disclosure.

It can be understood by those skilled in the art that in the specific implementation modes of the method, the writing sequence of each step does not mean a strict execution sequence and is not intended to form any limit to the implementation process and a specific execution sequence of each step should be determined by functions and probable internal logic thereof.

Based on the game image processing method disclosed in the abovementioned embodiments, the embodiments of the disclosure disclose a game image processing apparatus.

Figure 2:
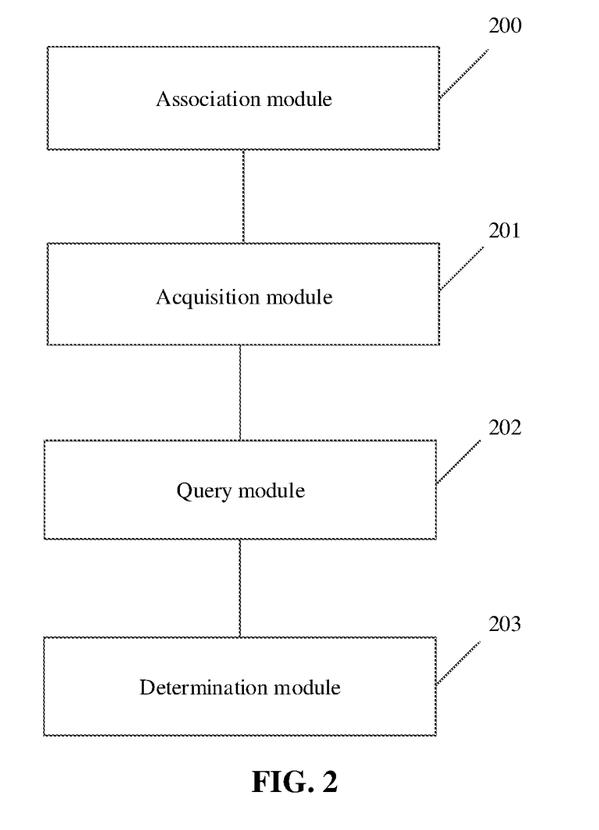
FIG. 2 is a composition structure diagram of a game image processing apparatus according to an embodiment of the disclosure.

FIG. 2 is a composition structure diagram of a game image processing apparatus according to an embodiment of the disclosure. As shown in FIG. 2, the apparatus may include an association module 200, an acquisition module 201, a query module 202, and a determination module 203.

The association module 200 is configured to, in a money substitute operating stage of a game, acquire a first game image of the game, and associate first money substitute information and human body image that are detected or recognized from the first game image to obtain association information.

The acquisition module 201 is configured to, in a payout stage of the game, acquire a detection and recognition result of a second game image of the game before payment or collection of money substitute, the detection and recognition result at least including second money substitute information.

The query module 202 is configured to, in a case of determining that the second money substitute information is successfully associated with a target human body image of the human body image according to the association information, query personal identity information corresponding to the target human body image.

The determination module 203 is configured to determine payout information corresponding to the personal identity information according to the second money substitute information in the detection and recognition result and a game result of the game.

In some embodiments, the money substitute operating stage includes a first operating stage and a second operating stage. The determination module 203 comprises:

a first sub-determination module, configured to determine association results of associating the first money substitute information and human body images acquired in the first operating stage and the second operating stage respectively according to the association information; and a second sub-determination module, configured to determine the payout information corresponding to the personal identity information according to the association results.

In some embodiments, the first operation stage includes a stage of operating a money substitute before game props are issued, and the second operation stage includes a stage of operating a money substitute according to a predetermined marker after the game props are issued, the predetermined marker being configured to identify a payout ratio. The second-sub determination module is configured to:

detect a predetermined maker in the second operating stage; and determine the payout information corresponding to the personal identity information according to the association results and a recognition result of the predetermined marker.

In some embodiments, the association module 200 is configured to:

determine money substitute information, that is first detected or recognized based on multiple frames of first game images acquired in the money substitute operating stage, as the first money substitute information, or determine money substitute information having changed, that is detected or is recognized based on multiple frames of first game images acquired in the money substitute operating stage, as the first money substitute information; and associate the first money substitute information with the human body image.

In some embodiments, the query module 202 is configured to:

acquire identification information of the second money substitute information in the detection and recognition result; and query the personal identity information corresponding to the target human body image from a pre-stored personal information table according to the identification information.

In some embodiments, the query module 202 is further configured to:

under the condition that the personal identity information corresponding to the target human body image is not found from the pre-stored personal information table, query personal identity information corresponding to the identification information from an image database according to the identification information.

In some embodiments, the apparatus further includes a storage module. The storage module is configured to:

store the personal identity information found from the image database and the target human body image in the personal information table.

In some embodiments, the query module 202 is further configured to:

under the condition that the personal identity information corresponding to the target human body image is not found from the image database, determine whether the second money substitute information associated with the target human body image meets a set condition; and responsive to determining that the second money substitute information associated with the target human body image meets the set condition, acquire the personal identity information corresponding to the target human body image according to a manual association instruction.

In some embodiments, the storage module is further configured to:

store the personal identity information corresponding to the target human body image and the target human body image in the personal information table.

In some embodiments, the query module 202 is further configured to:

in a case of determining that the second money substitute information fails to be associated with the human body image according to the association information, determine whether the second money substitute information meets the set condition according to the association information; and responsive to determining that the second money substitute information and recognition result meets the set condition, acquire a human body image associated with the second money substitute information and personal identity information corresponding to the human body image according to the manual association instruction.

In some embodiments, the storage module is further configured to:

store the human body image associated with the second money substitute information and the personal identity information in the personal information table.

In some embodiments, the first money substitute information or the second money substitute information each includes at least one of: personal identity information corresponding to the money substitute, a position of the money substitute, a type of the money substitute, a denomination of the money substitute, or the number of the money substitute.

In practical applications, all of the association module 200, the acquisition module 201, the query module 202, the determination module 203, and the storage module may be implemented using a processor in an electronic device. The processor may be at least one of an ASIC, a DSP, a DSPD, a PLD, an FPGA, a CPU, a controller, a microcontroller, or a microprocessor.

In addition, each function module in the embodiments may be integrated into a processing unit, or each unit may also exist independently, or two or more than two units may also be integrated into a unit. The integrated unit may be implemented in the form of hardware or in the form of software function modules.

When implemented in the form of software function modules and sold or used as an independent product, the integrated unit may be stored in a computer-readable storage medium. Based on such an understanding, the technical solution of the embodiment substantially or parts making contributions to the conventional art or all or part of the technical solution may be embodied in the form of software product, and the computer software product is stored in a storage medium, including a plurality of instructions configured to enable a computer device (which may be a personal computer, a server, a network device or the like) or a processor to execute all or part of the steps of the method in the embodiments. The storage medium includes: various media capable of storing program codes such as a U disk, a mobile Hard Disk Drive (HDD), a Read Only Memory (ROM), a Random Access Memory (RAM), a magnetic disk or an optical disk.

Specifically, a computer program instruction corresponding to the game image processing method in the embodiments may be stored in a storage medium such as an optical disk, a hard disk, and a U disk. When the computer program instruction corresponding to the game image processing method in the storage medium is read or executed by an electronic device, any game image processing method of the abovementioned embodiments is implemented.

Figure 3:
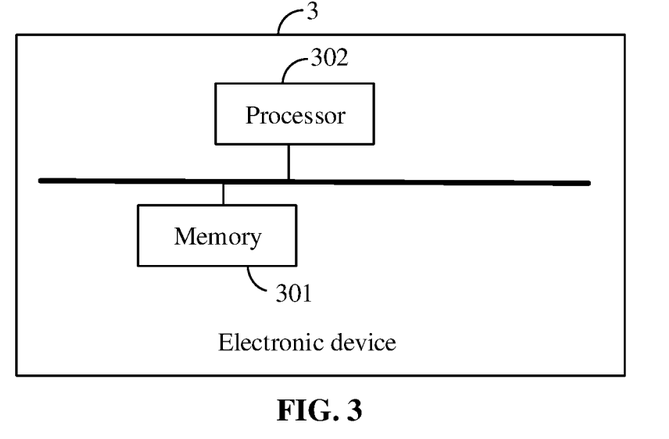
FIG. 3 is a structure diagram of an electronic device according to an embodiment of the disclosure.

Based on the same technical concept of the abovementioned embodiments, FIG. 3 illustrates an electronic device 3 provided in the embodiments of the disclosure, which may include a memory 301 and a processor 302.

The memory 301 is configured to store computer programs and data.

The processor 302 is configured to execute the computer programs stored in the memory to implement any of the game image processing method in the abovementioned embodiments.

In practical applications, the memory 301 may be a volatile memory such as a RAM, or a non-volatile memory such as a ROM, a flash memory, an HDD or a Solid-State Drive (SSD), or a combination of the memories, and provides instructions and data for the processor 302.

The processor 302 may be at least one of an ASIC, a DSP, a DSPD, a PLD, an FPGA, a CPU, a controller, a microcontroller and a microprocessor. It can be understood that, for different devices, other electronic components may be configured to realize functions of the processor, and no specific limits are made in the embodiment of the disclosure.

In some embodiments, functions or modules of the apparatus provided in the embodiment of the disclosure may be configured to execute the method described in the method embodiment and specific implementation thereof may refer to the descriptions about the method embodiment and, for simplicity, will not be elaborated herein.

The embodiments of the disclosure also provide a computer program, comprising computer-readable codes, where execution of the computer-readable codes by a computer causes the computer to execute the game image processing method as described above.

The above descriptions about the embodiments focus on differences between each embodiment and the same or similar parts may refer to each other and will not be elaborated herein for simplicity.

The methods disclosed in each method embodiment provided in the disclosure may be freely combined without conflicts to obtain new method embodiments.

The characteristics disclosed in each product embodiment provided in the disclosure may be freely combined without conflicts to obtain new product embodiments.

The characteristics disclosed in each method or device embodiment provided in the disclosure may be freely combined without conflicts to obtain new method embodiments or device embodiments.

From the above descriptions about the implementation modes, those skilled in the art may clearly know that the method of the abovementioned embodiments may be implemented in a manner of combining software and a necessary universal hardware platform, and of course, may also be implemented through hardware, but the former is a preferred implementation mode under many circumstances. Based on such an understanding, the technical solutions of the disclosure substantially or parts making contributions to the conventional art may be embodied in form of software product, and the computer software product is stored in a storage medium (for example, a ROM/RAM, a magnetic disk and an optical disk), including a plurality of instructions configured to enable a terminal (which may be a personal computer, a server, an air conditioner, a network device, etc.) to execute the method in each embodiment of the disclosure.

The embodiments of the disclosure are described above in combination with the drawings, but the disclosure is not limited to the abovementioned specific implementation modes. The abovementioned specific implementation modes are not restrictive but only schematic, those of ordinary skill in the art may be inspired by the disclosure to implement many forms without departing from the purpose of the disclosure and the scope of protection of the claims, and all these shall fall within the scope of protection of the disclosure.

The invention claimed is:

1. A game image processing method, comprising:
   in a money substitute operating stage of a game, acquiring a first game image of the game, and associating first money substitute information and human body image that are detected or recognized from the first game image, to obtain association information;
   in a payout stage of the game, acquiring a detection and recognition result for a second game image of the game before payment or collection of money substitute, the detection and recognition result at least comprising second money substitute information;
   matching the second money substitute information with the first money substitute information, and determining, according to the association information, whether the second money substitute information is successfully associated with a target human body image of the human body image;
   responsive to determining that the second money substitute information is successfully associated with the target human body image of the human body image, querying personal identity information corresponding to the target human body image, comprising:
      acquiring identification information of the second money substitute information;
      querying the personal identity information corresponding to the target human body image from a pre-stored personal information table according to the identification information; and
      when the personal identity information corresponding to the target human body image is not found from the pre-stored personal information table, querying personal identity information corresponding to the identification information from an image database according to the identification information; and
   determining payout information corresponding to the personal identity information corresponding to the target human body image or the personal identity information corresponding to the identification information according to the second money substitute information and a game result of the game.

2. The method of claim 1, wherein the money substitute operating stage comprises a first operating stage and a second operating stage, and determining the payout information corresponding to the personal identity information corresponding to the target human body image or the personal identity information corresponding to the identification information comprises:
- determining association results of associating the first money substitute information and human body images acquired in the first operating stage and the second operating stage respectively according to the association information; and
- determining the payout information corresponding to the personal identity information corresponding to the target human body image or the personal identity information corresponding to the identification information according to the association results.

3. The method of claim 2, wherein the first operating stage includes a stage of operating a money substitute before game props are issued, and the second operating stage includes a stage of operating a money substitute according to a predetermined marker after the game props are issued, the predetermined marker being configured to identify a payout ratio; and
- wherein determining the payout information corresponding to the personal identity information corresponding to the target human body image or the personal identity information corresponding to the identification information according to the association results comprises:
  - detecting a predetermined maker in the second operating stage; and
  - determining the payout information corresponding to the personal identity information corresponding to the target human body image or the personal identity information corresponding to the identification information according to the association results and a recognition result of the predetermined marker.

4. The method of claim 1, wherein associating the first money substitute information and the human body image that are detected or recognized from the first game image comprises:
- determining money substitute information, that is first detected or recognized based on multiple frames of first game images acquired in the money substitute operating stage, as the first money substitute information, or, determining money substitute information having changed, that is detected or recognized based on multiple frames of first game images acquired in the money substitute operating stage, as the first money substitute information; and
- associating the first money substitute information with the human body image.

5. The method of claim 1, further comprising:
- when the second money substitute information fails to be associated with the human body image according to the association information, determining whether the second money substitute information meets a set condition according to the association information; and
- responsive to determining that the second money substitute information meets the set condition, acquiring, according to a manual association instruction, a human body image associated with the second money substitute information and personal identity information corresponding to the human body image.

6. The method of claim 5, further comprising:
- storing the human body image associated with the second money substitute information and the personal identity information corresponding to the human body image in a personal information table.

7. The method of claim 1, wherein the first money substitute information and the second money substitute information comprise at least one of: personal identity information corresponding to a money substitute, a position of the money substitute, a type of the money substitute, a denomination of the money substitute, or a number of the money substitute, respectively.

8. The method of claim 1, further comprising:
- storing the personal identity information corresponding to the identification information found from the image database and the target human body image in the pre-stored personal information table.

9. The method of claim 1, further comprising:
- when under the condition that the personal identity information corresponding to the identification information target human body image is not found from the image database, determining whether the second money substitute information associated with the target human body image meets a set condition; and
- responsive to determining the second money substitute information associated with the target human body image meets the set condition, acquiring the personal identity information corresponding to the target human body image according to a manual association instruction.

10. The method of claim 9, further comprising:
- storing the personal identity information corresponding to the target human body image and the target human body image in the pre-stored personal information table.

11. An electronic device, comprising:
- a processor; and
- a memory for storing instructions executable by the processor,
- wherein the processor is configured to:
  - in a money substitute operating stage of a game, acquire a first game image of the game, and associate first money substitute information and human body image that are detected or recognized from the first game image, to obtain association information;
  - in a payout stage of the game, acquire a detection and recognition result for a second game image of the game before payment or collection of money substitute, the detection and recognition result at least comprising second money substitute information;
  - match the second money substitute information with the first money substitute information, and determine, according to the association information, whether the second money substitute information is successfully associated with a target human body image of the human body image;
  - responsive to determining that the second money substitute information is successfully associated with the target human body image of the human body image according to the association information, query personal identity information corresponding to the target human body image; and
  - determine payout information corresponding to the personal identity information corresponding to the target human body image or personal identity information corresponding to identification information according to the second money substitute information and a game result of the game
- wherein the processor is further configured to:
  - acquire the identification information of the second money substitute information;
  - query the personal identity information corresponding to the target human body image from a pre-stored personal information table according to the identification information; and when the personal identity information corresponding to the target human body image is not found from the pre-stored personal information table, query the personal identity information corresponding to the identification information from an image database according to the identification information.

12. The electronic device of claim 11, wherein the money substitute operating stage comprises a first operating stage and a second operating stage, and wherein the processor is specifically configured to:
determine association results of associating the first money substitute information and human body images acquired in the first operating stage and the second operating stage respectively according to the association information; and
determine the payout information corresponding to the personal identity information corresponding to the target human body image or the personal identity information corresponding to the identification information according to the association results.

13. The electronic device of claim 12, wherein the first operating stage includes a stage of operating a money substitute before game props are issued, and the second operating stage includes a stage of operating a money substitute according to a predetermined marker after the game props are issued, the predetermined marker being configured to identify a payout ratio; and wherein the processor is configured to:
detect a predetermined maker in the second operating stage; and
determine the payout information corresponding to the personal identity information corresponding to the target human body image or the personal identity information corresponding to the identification information according to the association results and a recognition result of the predetermined marker.

14. The electronic device of claim 11, wherein the processor is configured to:
determine money substitute information, that is first detected or recognized based on multiple frames of first game images acquired in the money substitute operating stage, as the first money substitute information, or determine money substitute information having changed, that is detected or recognized based on multiple frames of first game images acquired in the money substitute operating stage, as the first money substitute information, and
associate the first money substitute information with the human body image.

15. The electronic device of claim 11, wherein the processor is further configured to:

when the second money substitute information fails to be associated with the human body image according to the association information, determine whether the second money substitute information meets a set condition according to the association information; and
responsive to determining that the second money substitute information meets the set condition, acquire, according to a manual association instruction, a human body image associated with the second money substitute information and personal identity information corresponding to the human body image.

16. A non-transitory computer storage medium having stored therein a computer program that, when executed by a processor, causes the processor to implement the following operations:

in a money substitute operating stage of a game, acquiring a first game image of the game, and associating first money substitute information and human body image that are detected or recognized from the first game image, to obtain association information;

in a payout stage of the game, acquiring a detection and recognition result for a second game image of the game before payment or collection of money substitute, the detection and recognition result at least comprising second money substitute information;

matching the second money substitute information with the first money substitute information, and determining, according to the association information, whether the second money substitute information is successfully associated with a target human body image of the human body image;

responsive to determining that the second money substitute information is successfully associated with the target human body image of the human body image, querying personal identity information corresponding to the target human body image, comprising:
acquiring identification information of the second money substitute information;
querying the personal identity information corresponding to the target human body image from a pre-stored personal information table according to the identification information; and
when the personal identity information corresponding to the target human body image is not found from the pre-stored personal information table, querying personal identity information corresponding to the identification information from an image database according to the identification information; and determining payout information corresponding to the personal identity information corresponding to the target human body image or the personal identity information corresponding to the identification information according to the second money substitute information and a game result of the game.

\* \* \* \* \*